United States Patent
Feldhues et al.

(10) Patent No.: US 9,493,639 B2
(45) Date of Patent: Nov. 15, 2016

(54) SILICEOUS RUBBER MIXTURES CONTAINING OMEGA-MERCAPTOCARBOXYLIC ACID ESTER OF POLYVALENT ALCOHOLS

(71) Applicant: LANXESS Deutschland GmbH, Cologne (DE)

(72) Inventors: Ulrich Feldhues, Bergisch Gladbach (DE); Heinz Unterberg, Dormagen (DE); Hermann-Josef Weidenhaupt, Pulheim (DE); Melanie Wiedemeier-Jarad, Dormagen (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 14/411,666

(22) PCT Filed: Jul. 9, 2013

(86) PCT No.: PCT/EP2013/064493
§ 371 (c)(1),
(2) Date: Dec. 29, 2014

(87) PCT Pub. No.: WO2014/009373
PCT Pub. Date: Jan. 16, 2014

(65) Prior Publication Data
US 2015/0203670 A1    Jul. 23, 2015

(30) Foreign Application Priority Data
Jul. 9, 2012 (EP) .................... 12175550

(51) Int. Cl.
C08L 7/00    (2006.01)
C08L 9/00    (2006.01)
C08L 9/06    (2006.01)
C08K 5/37    (2006.01)

(52) U.S. Cl.
CPC . *C08L 9/06* (2013.01); *C08K 5/37* (2013.01); *C08L 7/00* (2013.01); *C08L 9/00* (2013.01); *C08L 2205/025* (2013.01)

(58) Field of Classification Search
None
See application file for complete search history.

(56) References Cited

U.S. PATENT DOCUMENTS

| | | |
|---|---|---|
| 4,076,550 A | 2/1978 | Thurn et al. |
| 4,709,065 A | 11/1987 | Yoshioka et al. |
| 5,663,226 A | 9/1997 | Scholl et al. |
| 5,733,963 A | 3/1998 | Sandstrom et al. |
| 6,268,421 B1 | 7/2001 | Dittrich et al. |
| 6,359,045 B1 | 3/2002 | Jeske et al. |
| 6,521,684 B2 | 2/2003 | Scholl et al. |
| 8,865,841 B2 | 10/2014 | Kitano et al. |
| 2014/0005297 A1* | 1/2014 | Papakonstantopoulos C08L 9/06 523/156 |

FOREIGN PATENT DOCUMENTS

| EP | 0489313 A1 | 6/1992 |
|---|---|---|
| EP | 2311907 A1 | 4/2011 |

OTHER PUBLICATIONS

"Vulcanization". Encyclopdia Britannica. Encyclopdia Britannica Online. Encyclopdia Britannica Inc., 2016. Web. Jan. 19, 2016.*
International Search Report from International Application No. PCT?EP2013/064493, dated Oct. 17, 2013, two pages.

* cited by examiner

*Primary Examiner* — Vu A Nguyen

(57) ABSTRACT

The present invention relates to rubber mixtures comprising respectively at least one rubber, one sulfur-containing alkoxysilane, one silicon-based filler, and one ω-mercaptocarboxylic ester of polyhydric alcohols.

17 Claims, No Drawings

SILICEOUS RUBBER MIXTURES CONTAINING OMEGA-MERCAPTOCARBOXYLIC ACID ESTER OF POLYVALENT ALCOHOLS

The present invention relates to silica-containing rubber mixtures comprising ω-mercaptocarboxylic esters of polyhydric alcohols, to rubber vulcanizates produced therefrom, and to use thereof.

Silica-containing rubber mixtures are important starting materials, for example for the production of tires with reduced rolling resistance. These consume less rolling deformation energy, and therefore reduce fuel consumption. Various states have decided to require marking of rolling resistance on tires, and there is therefore great interest in achieving a further improvement in this resistance; however, this may not be achieved by sacrificing wet grip, since the latter is relevant to safety.

Many proposed solutions have been devised for reducing rolling resistance. DE 2 255 577 A and DE 4 435 311 A, EP-A 0 0670 347, and U.S. Pat. No. 4,709,065 describe polysulfidic silanes as reinforcing additives for silica-containing rubber mixtures. The property profile of the resultant rubber vulcanizates is not yet ideal. In particular, the abrasion values are disadvantageously high. High abrasion values can have a very disadvantageous effect on the lifetime of the products.

Another important factor in the processing of rubbers is that the rubber mixture initially prepared with the additives has low flow viscosity (Mooney viscosity ML 1+4/100° C.), in order that it can be processed easily. Other additional substances have been proposed for improving the processability of silica-containing rubber mixtures, examples being fatty acid esters, fatty acid salts, and mineral oils. The additional substances mentioned have the disadvantage that while they increase flowability they simultaneously reduce the moduli at relatively high elongation (e.g., from 100% to 300%), or else reduce the hardness of the vulcanizates, thus reducing the reinforcing effect of the filler. Inadequate hardness or stiffness of the vulcanizate results in unsatisfactory running performance of the tire, particularly around curves. The hardness of the vulcanizate can be increased by increasing the proportion of reinforcing filler, or by reducing the proportion of plasticizer oil, but each of these two measures brings the disadvantage of higher mixture viscosity during processing.

EP 1 134 253 describes polyether additives for silica-containing rubber vulcanizates which do not exhibit the abovementioned disadvantage of modulus reduction. However, the person skilled in the art requires large usage quantities (quantities used in the examples being 4 phr and 8 phr). The teaching of EP 1 134 253 is directed to achievement of improved processing performance, and the inventive examples there also provide evidence of low mixture viscosity and increased hardness. However, there is no indication that the polyether additives used improve abrasion, wet grip, or rolling resistance in comparison with the prior art.

EP 0 489 313 describes additives comprising glycol functions and having good mechanical properties and improved hysteresis performance. However, when the examples are compared with the bis-[-3-(triethoxysilyl)propyl]tetrasulfide as in DE-OS (German Published Specification) 2 255 577, the examples reveal no improvement in rolling resistance (tan δ at 60° C.). There is practically no effect on wet grip (tan d at low temperature). Furthermore, EP 0 489 313 contains no indication that the additives used comprising glycol functions improve abrasion in comparison with the prior art.

EP 1 000 968 moreover uses a bis-[-3-(triethoxysilyl)propyl]tetrasulfide in combination with a specific anti-reversion agent in SBR. In comparison with the prior art, there is no improvement in wet grip (tan δ at 0° C.) or in rolling resistance (tan δ at 60° C.), and there is only slight improvement in abrasion. However, the latter remains disadvantageously high.

EP 0 791 622 B1 describes a rubber composition with at least one elastomer based on diene, silica, and carbon black as filler, and tetrathiodipropanol polysulfide, alone or together with bis(3-trialkoxysilylalkyl)polysulfide. However, the quantity of tetrathiodipropanol polysulfide here is greater than the quantity of bis(3-trialkoxysilylalkyl)polysulfide, and this is economically disadvantageous. In particular, the addition of tetrathiodipropanol polysulfide appears to impair wet grip. This mixture moreover exhibit very low tensile strength values and high abrasion values.

It is an object of the present invention to find additives and therewith to provide novel rubber mixtures which, while retaining good flowability, can be converted into vulcanizates with increased hardness and/or stiffness, which when used in tires improve rolling resistance, abrasion, and wet grip.

Surprisingly, it has now been found that, in combination with sulfur-containing alkoxysilanes, ω-mercaptocarboxylic esters of polyhydric alcohols do not substantially impair the flowability of rubber mixtures and lead to vulcanizates with good dynamic performance and with markedly increased hardness/stiffness, and in particular with low abrasion.

The invention therefore provides rubber mixtures comprising respectively at least one rubber, one sulfur-containing alkoxysilane, one silica-based filler, and one ω-mercapto-$C_2$-$C_6$-carboxylic ester of a polyhydric $C_2$-$C_6$-alcohol, where at least 33%, preferably at least 50%, and particularly preferably at least 66%, and most preferably at least 75%, but at least 2, of the hydroxy groups of the polyhydric $C_2$-$C_6$-alcohol are esterified with ω-mercapto-$C_2$-$C_6$-carboxylic acid(s). The polyhydric $C_2$-$C_6$ alcohol typically has at most one hydroxy group per C atom. It is preferable that the polyhydric alcohol is ethylene glycol, diethylene glycol, triethylene glycol, trimethylolpropane, neopentyl glycol, glycerol, or pentaerythritol, particularly ethylene glycol, trimethylolpropane, or pentaerythritol, and very particularly trimethylolpropane or pentaerythritol. ω-Mercapto-$C_2$-$C_6$-carboxylic acid that can be used is carboxylic acids which have, between thiol group and carboxy group, a linear or branched, preferably a linear, $C_1$-$C_3$-alkanediyl unit, preferably a $C_1$-$C_3$ alkanediyl unit, and very particularly preferably a $C_2$-alkanediyl unit. There can also be different ω-mercapto-$C_2$-$C_6$-carboxylic acids esterified with the polyhydric alcohol. Particularly preferred embodiments of the present ω-mercapto-$C_2$-$C_6$-carboxylic esters of polyhydric alcohols are compounds of the formulae (I), (II), and (III)

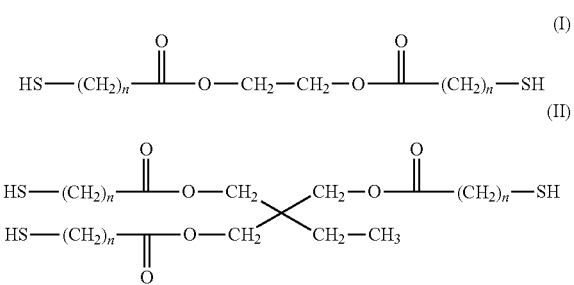

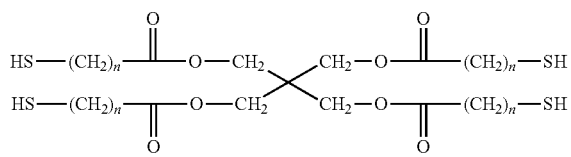

where n is 1, 2, or 3, preferably 1 or 2, particularly preferably 2.

Preference is given to rubber mixtures which comprise one or more compounds of the formula (II) and/or (III), particularly to rubber mixtures which comprise at least one compound of the formula (III), and most preference is given to rubber mixtures which comprise trimethylolpropane tri-3-mercaptopropionate (CAS No.: 33007-83-9) and/or pentaerythritol tetra-3-mercaptopropionate (CAS No.: 7575-23-7).

The rubber mixtures of the invention can also comprise the ω-mercaptocarboxylic esters of polyhydric alcohols entirely or to some extent in the form of their salts, e.g. lithium, sodium, potassium, calcium, strontium, barium, and/or zinc salts, preferably in the form of the zinc salts. Compounds of this type are therefore intended to be included in the meaning of the expression ω-mercaptocarboxylic esters of polyhydric alcohols in the claims.

The thiol functions of the ω-mercaptocarboxylic esters of polyhydric alcohols in the rubber mixtures of the invention can also to some extent be present in a form that has been intra- or intermolecularly oxidized to give disulfide groups, and when intermolecular disulfide formation occurs here with analogous compounds and/or with other thiols there can also be oligomeric or polymeric structures present. Compounds of this type are therefore intended to be included in the meaning of the expression ω-mercaptocarboxylic esters of polyhydric alcohols in the claims.

The ω-mercaptocarboxylic esters of polyhydric alcohols can also be used to some extent or entirely in a form that has been absorbed on inert, organic, or inorganic carriers. Preferred carrier materials are silica, natural and synthetic silicates, aluminum oxide, and/or carbon blacks.

The total content of the ω-mercaptocarboxylic esters of polyhydric alcohols in the rubber mixtures of the invention is preferably from 0.1 to 15 phr, particularly preferably from 0.3 to 7 phr, very particularly preferably from 0.5 to 3 phr, and most preferably from 0.7 to 1.5 phr. The unit phr represents parts by weight based on 100 parts by weight of rubber used in the rubber mixture.

Production of the rubber mixtures of the invention can use natural rubber and synthetic rubbers. Examples of preferred synthetic rubbers are BR—polybutadiene
ABR—butadiene/$C_1$-$C_4$-alkyl acrylate copolymer
CR—polychloroprene
IR—polyisoprene
SBR—styrene/butadiene copolymers with styrene contents of from 1 to 60% by weight, preferably from 20 to 50% by weight
IIR—isobutylene/isoprene copolymers
NBR—butadiene/acrylonitrile copolymers with acrylonitrile contents of from 5 to 60% by weight, preferably from 10 to 50% by weight
HNBR—partially hydrogenated or fully hydrogenated NBR rubber
EPDM—ethylene/propylene/diene copolymers,
and mixtures of two or more of these rubbers.

It is preferable that the rubber mixtures of the invention comprise at least one SBR rubber and at least one BR rubber, particularly in an SBR:BR ratio by weight of from 60:40 to 90:10.

In one advantageous embodiment, the rubber mixtures of the invention moreover comprise at least one NR rubber. It is particularly preferable that they comprise at least one SBR rubber, at least one BR rubber, and at least one NR rubber, and it is very particularly preferable here that the ratio by weight of SBR rubber to BR rubber to NR rubber is from 60 to 85:from 10 to 35:from 5 to 20.

Examples of suitable sulfur-containing alkoxysilanes for the rubber mixtures of the invention are bis(triethoxysilylpropyl)tetrasulfane (e.g. Si 69 from Evonik) and bis(triethoxysilylpropyl)disulfane (e.g. Si 75 from Evonik), 3-(triethoxysilyl)-1-propanethiol, polyether-functionalized mercaptosilanes such as Si 363 from Evonik, and thioester-functionalized alkoxysilanes such as NXT car NXT Z from Momentive (previously GE). It is also possible to use mixtures of the sulfur-containing alkoxysilanes. Liquid sulfur-containing alkoxysilanes can have been absorbed on as carrier in order to improve ease of metering and/or ease of dispersion (dry liquid). The active ingredient content is from 30 to 70 parts by weight, preferably from 40 to 60 parts by weight, for every 100 parts by weight of dry liquid.

The proportion of the sulfur-containing alkoxysilanes in the rubber mixtures of the invention is preferably from 2 to 20 phr, particularly preferably from 3 to 11 phr, and very particularly preferably from 5 to 8 phr, respectively calculated on the basis of 100% active ingredient. It is preferable that the quantity of sulfur-containing alkoxysilane is greater than or equal to the total quantity of ω-mercaptocarboxylic esters of polyhydric alcohols. The ratio by weight of sulfur-containing alkoxysilane to the total quantity of ω-mercaptocarboxylic esters of polyhydric alcohols is particularly preferably from 1.5:1 to 20:1, very particularly preferably from 3:1 to 15:1, and most preferably from 5:1 to 10:1.

The rubber mixture of the invention moreover comprises one or more silica-based fillers. Substances preferably used here are the following:

silica, in particular precipitated silica or fumed silica, produced for example via precipitation of solutions of silicates or flame hydrolysis of silicon halides with specific surface areas of from 5 to 1000 $m^2/g$, preferably from 20 to 400 $m^2/g$ (BET surface area) and with primary particle sizes of from 10 to 400 nm. The silicas can optionally also take the form of mixed oxides with other metal oxides such as oxides of Al, of Mg, of Ca, of Ba, of Zn, of Zr, or of Ti.

synthetic silicates such as aluminum silicate, alkaline earth metal silicates such as magnesium silicate or calcium silicate, with BET surface areas of from 20 to 400 $m^2/g$ and primary particle size of from 10 to 400 nm, natural silicates such as kaolin and other naturally occurring silicas, glass fibers including those in the form of mats and strands, glass microspheres.

It is of course possible to use additional fillers. Carbon blacks produced by the lamp-black, furnace-black, or gas-black process are particularly suitable for this purpose where the BET surface areas of these are from 20 to 200 $m^2/g$, examples being SAF, ISAF, IISAF, HAF, FEF, or GPF carbon blacks.

The total content of fillers is preferably from 10 to 200 phr, particularly preferably from 50 to 160 phr, and very particularly preferably from 60 to 120 phr.

A particularly preferred embodiment is provided by the combination of silica, carbon black, and ω-mercaptocarboxylic esters of polyhydric alcohols. The ratio of silica to carbon black here can vary within any desired limits, but for the application in tires preference is given to a silica:carbon black ratio by weight of from 20:1 to 1.5:1.

In one preferred embodiment, the rubber mixtures of the invention also comprise one or more crosslinking agents. Sulfur-based or peroxidic crosslinking agents are particularly suitable for this purpose.

Peroxidic crosslinking agents preferably used are bis(2,4-dichlorobenzyl)peroxide, dibenzoyl peroxide, bis(4-chlorobenzoyl)peroxide, 1,1-bis(tert-butylperoxy)-3,3,5-trimethylcyclohexane, tert-butyl perbenzoate, 2,2-bis(tert-butylperoxy)butane, 4,4-di-tert-butylperoxynonyl valerate, dicumyl peroxide, 2,5-dimethyl-2,5-di(tert-butylperoxy)hexane, tert-butyl cumyl peroxide, 1,3-bis(tert-butylperoxyisopropyl)benzene, di-tert-butyl peroxide, and 2,5-dimethyl-2,5-di(tert-butylperoxy)-3-hexyne.

Other additions that can also be used with advantage, alongside these peroxidic crosslinking agents, are those that can increase crosslinking yield: examples of compounds suitable for this purpose are triallyl isocyanurate, triallyl cyanurate, trimethylolpropane tri(meth)acrylate, triallyl trimellitate, ethylene glycol di(meth)acrylate, butanediol di(meth)acrylate, trimetylolpropane tri(meth)acrylate, zinc diacrylate, zinc dimethacrylate, 1,2-polybutadiene, and N,N'-m-phenylenedimaleimide.

Sulfur can be used as crosslinking agent in elemental soluble or insoluble form, or in the form of sulfur donors. Examples of sulfur donors that can be used are dimorpholyl disulfide (DTDM), 2-morpholinodithiobenzothiazole (MBSS), caprolactam disulfide, dipentamethylenethiuram tetrasulfide (DPTT), and tetramethylthiuram disulfide (TMTD).

The crosslinking of the rubber mixtures of the invention can in principle be achieved with sulfur or sulfur donors alone, or in conjunction with vulcanization accelerators, examples of compounds suitable for these being dithiocarbamates, thiurams, thiazoles, sulfenamides, xanthogenates, bi- or polycyclic amines, guanidine derivatives, dithiophosphates, caprolactams, and thiourea derivatives. Other compounds suitable are moreover zinc diamine diisocyanate, hexamethylenetetramine, 1,3-bis(citraconimidomethyl)benzene, and also cyclic disulfanes. It is preferable that the rubber mixtures of the invention comprise sulfur-based crosslinking agents and vulcanization accelerators.

Crosslinking agents particularly preferably used are sulfur, magnesium oxide, and/or zinc oxide; the known vulcanization accelerators such as mercaptobenzothiazoles, thiazolsulfenamides, thiurams, thiocarbamates, guanidines, xanthogenates, and thiophosphates are added to these.

Preferred quantities used of the crosslinking agents and vulcanization accelerators are from 0.1 to 10 phr, particularly from 0.1 to 5 phr.

The rubber mixtures of the invention can comprise other rubber auxiliaries, such as reaction accelerators, aging inhibitors, heat stabilizers, light stabilizers, antioxidants, in particular antiozonants, flame retardants, processing aids, impact-resistance improvers, plasticizers, tackifiers, blowing agents, dyes, pigments, waxes, extenders, organic acids, retarders, metal oxides, and activators, in particular triethanolamine, polyethylene glycol, hexanetriol, and anti-reversion agents.

The quantities used of these rubber auxiliaries are conventional, depending inter alia on the intended purpose of the vulcanizates. Conventional quantities are from 0.1 to 30 phr.

Preferred aging inhibitors used are alkylated phenols, styrenated phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioether, 2,2'-methylenebis-(4-methyl-6-tert-butylphenol) (BPH), and also sterically hindered thiobisphenols.

If discoloration of the rubber is not important, it is also possible to use aminic aging inhibitors, e.g. mixtures of diaryl-p-phenylenediamines (DTPD), octylated diphenylamine (ODPA), phenyl-α-naphthylamine (PAN), phenyl-β-naphthylamine (PBN), preferably those based on phenylenediamine, e.g. N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD).

Other aging inhibitors are phosphites such as tris(nonylphenyl)phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI), these mostly being used in combination with above phenolic aging inhibitors. TMQ, MBI, and MMBI are mainly used for NBRs which are vulcanized peroxidically.

Ozone resistance can be improved via antioxidants such as N-1,3-dimethylbutyl-N'-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD), enol ethers, or cyclic acetals.

Processing aids are intended to act between the rubber particles, and to counteract frictional forces during mixing, plastification, and deformation. The rubber mixtures of the invention can comprise, as processing aids, any of the lubricants that are conventional for the processing of plastics, for example hydrocarbons such as oils, paraffins, and PE waxes, fatty alcohols having from 6 to 20C atoms, ketones, carboxylic acids, such as fatty acids and montanic acids, oxidized PE wax, metal salts of carboxylic acids, carboxamides, and also carboxylic esters, for example with the alcohols ethanol, fatty alcohols, glycerol, ethanediol, pentaerythritol, and with long-chain carboxylic acids as acid component.

The rubber mixture composition of the invention can also comprise flame retardants in order to reduce flammability and to reduce smoke generation during combustion. Examples of materials used for this purpose are antimony trioxide, phosphoric esters, chloroparaffin, aluminum hydroxide, boron compounds, zinc compounds, molybdenum trioxide, ferrocene, calcium carbonate, and magnesium carbonate.

Prior to crosslinking, it is also possible to add other plastics to the rubber vulcanizate, where these act by way of example as polymeric processing aids or as impact-resistance improvers. These plastics are preferably selected from the group consisting of the home- and copolymers based on ethylene, propylene, butadiene, styrene, vinyl acetate, vinyl chloride, glycidyl acrylate, glycidyl methacrylate, and on acrylates and methacrylates with alcohol components of branched or unbranched $C_1$-to $C_{10}$-alcohols, where particular preference is given to polyacrylates having identical or different alcohol moieties from the group of the $C_4$- to $C_8$-alcohols, in particular of butanol, hexanol, of octanol, and of 2-ethylhexanol, to polymethyl methacrylate, to methyl methacrylate-butyl acrylate copolymers, to methyl methacrylate-butyl methacrylate copolymers, to ethylene-vinyl acetate copolymers, to chlorinated polyethylene, to ethylene-propylene copolymers, and to ethylene-propylene diene copolymers.

In one preferred embodiment, the rubber mixture of the invention comprises from 0.1 to 15 phr of the anti-reversion agent 1,6-bis(N,N-dibenzylthiocarbamoyldithio)hexane (CAS No.: 151900-44-6), permitting further reduction of tan δ (60° C.), i.e. of rolling resistance.

A typical feature of the rubber mixture of the invention is that the loss factor tan δ at 60° C. of a vulcanizate produced therefrom under 170° C./t95 heating conditions is <0.12.

A preferred feature of the rubber mixture of the invention is that the loss factor tan δ at 60° C. of a vulcanizate produced therefrom under 170° C./t95 heating conditions is <0.12, while its Shore A hardness at 23° C. is >64, in particular >65. In combination with this, the rubber mixtures of the invention can also give a full vulcanization time less than 2000 seconds, and abrasion <60, particularly preferably <55.

The present invention further provides a process for the production of rubber mixtures via mixing of at least one rubber with at least one silica-based filler, one sulfur-containing alkoxysilane, and at least one ω-mercaptocarboxylic ester of a polyhydric alcohol. It is preferable here to use from 10 to 150 phr, particularly from 30 to 120 phr, and very particularly from 50 to 100 phr, of filler, from 0.1 to 15 phr, particularly from 0.3 to 7 phr, very particularly from 0.5 to 3 phr, and most preferably from 0.7 to 1.5 phr, ω-mercaptocarboxylic ester of polyhydric alcohols, and from 2 to 20 phr, particularly from 3 to 11 phr, and very particularly from 5 to 8 phr, of the sulfur-containing alkoxysilane. The abovementioned additional fillers, crosslinking agents, vulcanization accelerators, and rubber auxiliaries can moreover be added in the mixing process, preferably in the quantities stated above.

When a plurality of ω-mercaptocarboxylic esters of polyhydric alcohols are used, these can be added separately or in any desired mixture to the rubber mixture. It is preferable in the multistage mixing process that the addition of the ω-mercaptocarboxylic esters of polyhydric alcohols takes place in the first part of the mixing process, and that the addition of one or more crosslinking agents, in particular sulfur, and optionally of vulcanization accelerators, takes place in a subsequent mixing stage. The temperature of the rubber composition here is preferably from 100 to 200° C., particularly from 120° C. to 170° C. The shear rates during the mixing process are from 1 to 1000 sec$^{-1}$, preferably from 1 to 100 sec$^{-1}$. In one preferred embodiment, the rubber mixture is cooled after the first mixing stage, and the crosslinking agent and optionally crosslinking accelerator and/or additions used to increase crosslinking yield are added in a subsequent mixing stage at <140° C., preferably <100° C. It is likewise possible to add the ω-mercaptocarboxylic esters of polyhydric alcohols in a subsequent mixing stage and at lower temperatures, for example from 40 to 100° C., e.g. together with sulfur and crosslinking accelerator.

The blending of the rubber with the filler and with the ω-mercaptocarboxylic ester of polyhydric alcohols can be carried out in/on conventional mixing assemblies, for example rolls, internal mixers, and mixing extruders.

The optional addition of 1,6-bis(N,N-dibenzylthiocarbamoyldithio)hexane preferably takes place in the first stage of the multistage mixing process.

The present invention further provides a process for the vulcanization of the rubber mixtures of the invention which is preferably carried out when temperatures of the composition are from 100 to 200° C., particularly from 130 to 180° C. In one preferred embodiment the vulcanization process takes place at a pressure of from 10 to 200 bar.

The present invention also encompasses rubber vulcanizates obtainable via vulcanization of the rubber mixtures of the invention. These vulcanizates have, in particular when used in tires, the advantages of low rolling resistance coupled with good wet grip and with low wear.

The rubber vulcanizates of the invention are suitable for the production of moldings with improved properties, e.g. for the production of cable sheathing, of hoses, of drive belts, of conveyor belts, of roll coverings, of tires, of shoe soles, of sealing rings, and of damping elements.

The rubber vulcanizate of the invention can moreover be used for the production of foams. For this, chemical or physical blowing agents are added thereto. Any of the substances known for this purpose can be used as chemical blowing agents, for example azodicarbonamide, p-toluenesulfonyl hydrazide, 4,4'-oxybis(benzenesulfohydrazide), p-toluenesulfonyl semicarbazide, 5-phenyltetrazole, N,N'-dinitrosopentamethylenetetramine, zinc carbonate, or sodium hydrogencarbonate, and also mixtures comprising these substances. Examples of physical blowing agents are carbon dioxide and halogenated hydrocarbons.

The present invention further provides the use of ω-mercapto-$C_2$-$C_6$-carboxylic ester of a polyhydric $C_2$-$C_6$-alcohol in which at least 33%, preferably at least 50%, and particularly preferably at least 66%, and most preferably at least 75%, but at least 2, of the hydroxy groups of the polyhydric $C_2$-$C_6$-alcohol have been esterified with ω-mercapto-$C_2$-$C_6$-carboxylic acid(s), where the polyhydric alcohol is preferably ethylene glycol, diethylene glycol, triethylene glycol, trimethylolpropane, neopentyl glycol, glycerol, or pentaerythritol, particularly preferably ethylene glycol, trimethylolpropane, or pentaerythritol, and very particularly preferably trimethylolpropane or pentaerythritol, where the ω-mercapto-$C_2$-$C_6$-carboxylic ester is preferably based on one or more ω-mercapto-$C_2$-$C_6$-carboxylic acids which has, between thiol group and carboxy group, a linear or branched, preferably a linear, $C_1$-$C_5$alkanediyl unit, preferably a $C_1$-$C_3$ alkanediyl unit, and very particularly preferably a $C_2$-alkanediyl unit, in particular of one or more compounds of the formulae I, II, and III, for the production of rubber mixtures and vulcanizates thereof, in particular for the production of rubber mixtures comprising at least respectively one rubber, one sulfur-containing alkoxysilane, and one silica-based filler.

Determination of Properties of Rubber Mixture and of Vulcanizates:

Measurement of Mooney Viscosity:

Viscosity can be determined directly from the force with which the rubbers (and rubber mixtures) resist processing thereof. In the Mooney shearing disk viscometer, a fluted disk is enclosed, above and below, by test substance and is rotated at about two revolutions per minute in a heatable chamber. The force required here is measured in the form of torque, and corresponds to the respective viscosity. The sample is generally preheated for one minute to 100° C.; the measurement takes a further 4 minutes, the temperature being kept constant here. The viscosity is stated together with the respective test conditions, an example being ML (1+4) 100° C. (Mooney viscosity, large rotor, preheat time and test time in minutes, test temperature).

Scorch Performance (Scorch Time t5):

The same test can moreover be used as described above to measure the scorch performance of a mixture. The selected temperature was 130° C. The rotor runs until, after the torque value has passed through a minimum, it has increased to 5 Mooney units above the minimum value (t5). The greater the value (unit being seconds), the slower the scorch. An advantageous scorch time in practice is mostly more than 300 seconds, and with reference to reduction of processing risk and to the cost of time said time should be less than 1000 seconds, and in particular instances less than 500 seconds.

170° C./t95 Full Vulcanization Time from Rheometer (Vulcameter):

The MDR (moving die rheometer) vulcanization profile and analytical data associated therewith are measured in a Monsanto MDR 2000 rheometer in accordance with ASTM D5289-95. The full vulcanization time determined is the time at which 95% of the rubber has been crosslinked. The selected temperature was 170° C.

Hardness Determination:

The hardness of the rubber mixture of the invention was determined by producing roll-milled sheets of thickness 6 mm from the rubber mixture in accordance with formulations of table 1. Test samples of diameter 35 mm were cut from the roll-milled sheets, and the Shore A hardness of these was determined by using a digital Shore hardness tester (Zwick GmbH & Co. KG, Ulm). The hardness of a rubber vulcanizate provides a first indication of its stiffness.

Tensile Test:

The tensile test serves directly to determine the loading limits of an elastomer, and is carried out in accordance with DIN 53504.

Dyn. Damping:

Dynamic test methods are used to characterize the deformation behavior of elastomers under periodically changing loads. An externally applied stress changes the conformation of the polymer chain. The loss factor tan δ is determined indirectly here by way of the ratio of loss modulus G" to storage modulus G'. The loss factor tan δ (0° C.) provides a first indication of wet grip, and should be as high as possible (good wet grip), whereas tan δ at from 60 to 70° C. is associated with rolling resistance and should be as low as possible.

Abrasion:

Abrasion gives an indication of wear, and thus of product lifetime. Abrasion was determined in accordance with DIN 53516. A low value is desirable for economic and environmental reasons.

Compound 1

$$HS-CH_2-\overset{O}{\underset{\|}{C}}-O-CH_2-CH_2-O-\overset{O}{\underset{\|}{C}}-CH_2-CH_2-SH \quad (IV)$$

Compound 2

$$\begin{array}{c} HS-CH_2-CH_2-\overset{O}{\underset{\|}{C}}-O-CH_2 \\ HS-CH_2-CH_2-\overset{O}{\underset{\|}{C}}-O-CH_2 \end{array} \underset{}{\overset{}{>}} \underset{CH_2-CH_3}{\overset{CH_2-O-\overset{O}{\underset{\|}{C}}-CH_2-CH_2-SH}{}} \quad (V)$$

Compound 3

$$\begin{array}{c} HS-CH_2-CH_2-\overset{O}{\underset{\|}{C}}-O-CH_2 \\ HS-CH_2-CH_2-\overset{O}{\underset{\|}{C}}-O-CH_2 \end{array} \underset{}{\overset{}{>}} \underset{CH_2-O-\overset{O}{\underset{\|}{C}}-CH_2-CH_2-SH}{\overset{CH_2-O-\overset{O}{\underset{\|}{C}}-CH_2-CH_2-SH}{}} \quad (VI)$$

Compound 4 Zinc salt of glycol di(3mercaptopropionate)

HS–CH₂CH₂–C(=O)–O–CH₂CH₂–O–C(=O)–CH₂CH₂–SH $\xrightarrow{NaOH\ +\ ZnSO_4}$

S⁻–CH₂CH₂–C(=O)–O–CH₂CH₂–O–C(=O)–CH₂CH₂–S⁻  Zn²⁺

Apparatus: 2000 ml four-necked flask with thermometer, dropping funnel with pressure equalization, reflux condenser with gas-outlet attachment (bubble counter), and tubing, stirrer, pH electrode Initial charge: 72.7 g (0.3 mol) of glycol di(3-mercaptopropionate) 98% ex Bruno Bock 600 ml of deionized water Feed: 240 g (0.6 mol) of NaOH solution (10%)

Feed: 53.8 g (0.3 mol) of ZnSO₄×H₂O p.A.(Aldrich) dissolved in 450 ml of deionized water The water and glycol di(3-mercaptopropionate) were used as initial charge in the nitrogen-flushed apparatus. The NaOH solution was then added dropwise at a temperature of from 0 to 5° C. in about 30 min while nitrogen was passed through the system, and stirring was continued for a further 30 min.

The ZnSO₄ solution was then added dropwise at from 0 to 5° C. in 1 h, and stirring was continued for 30 min. The Zn salt was isolated by suction filtration by way of a D4 frit, and washed with portions of 500 ml of water until conductivity was <0.3 millisiemens. The product was dried in a vacuum drying oven at 50° C.

Yield: 92.4 g (102%)

Compound 5 Zinc salt of trimethylolpropane tris(3-mercaptopropionate)

2 × [HS–CH₂CH₂–C(=O)–O–CH₂–C(–CH₂–O–C(=O)–CH₂CH₂–SH)(–CH₃)(–CH₂–O–...)]

$\xrightarrow{NaOH\ +\ ZnSO_4}$

-continued

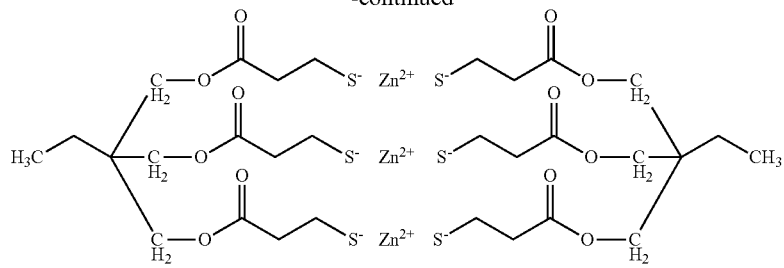

Apparatus: 2000 ml four-necked flask with thermometer, dropping funnel with pressure equalization, reflux condenser with gas-outlet attachment (bubble counter), and tubing, stirrer, pH electrode Initial charge: 81.9 g (0.2 mol) of trimethylolpropane tris (3-mercaptopropionate) 97% ex Bruno Bock 600 ml of deionized water Feed: 215 g (0.54 mol) of NaOH solution (10%)

Feed: 53.8 g (0.3 mol) of $ZnSO_4 \times H_2O$ (Aldrich, 100%) dissolved in 450 ml of deionized water The water and trimethylolpropane tris(3-mercaptopropionate) were used as initial charge in the nitrogen-flushed apparatus. The NaOH solution was then added dropwise at a temperature of from 0 to 5° C. in about 30 min while nitrogen was passed through the system, and stirring was continued for a further 30 min.

The $ZnSO_4$ solution was then added dropwise at from 0 to 5° C. in 1 h; and stirring was continued for 30 min. The Zn salt was isolated by suction filtration by way of a D4 frit, and washed with portions of 500 ml of water until conductivity was <0.3 millisiemens. The product was dried in a vacuum drying oven at 35° C.

Yield: 98.9 g (100%)

Compound 6 Zinc salt of pentaerythritol tetra(3-mercaptopropionate)

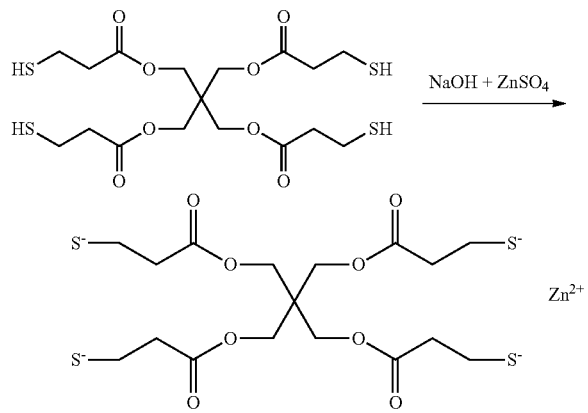

Apparatus: 1000 ml four-necked flask with thermometer, dropping funnel with pressure equalization, reflux condenser with gas-outlet attachment (bubble counter), and tubing, stirrer, pH electrode Initial charge: 37.5 g (0.075 mol) of pentaerythritol tetra(3-mercaptopropionate) 98% ex Bruno Bock 300 ml of deionized water Feed: 26.9 g (0.15 mol) of $ZnSO_4 \times H_2O$ (Aldrich, 100%) dissolved in 225 ml of deionized water Feed: 120 g (0.3 mol) of NaOH solution (10%)

The water and pentaerythritol tetra(3-mercaptopropionate) were used as initial charge in the nitrogen-flushed apparatus. The $ZnSO_4$ solution was then added dropwise at a temperature of from 0 to 5° C. in about 60 min while nitrogen was passed through the system, and stirring was continued for a further 30 min.

The NaOH solution was then added dropwise at from 0 at 5° C. in 1 h, and stirring was continued for 30 min. The Zn salt was isolated by suction filtration by way of a D4 frit, and washed with portions of 500 ml of water until conductivity was <0.3 millisiemens. The product was dried in a vacuum drying oven at 50° C.

Yield: 47.0 g (102%)

Production of Rubber Mixtures and of Rubber Vulcanizates

The rubber formulations listed in table 1 were respectively mixed in accordance with multistage processes described below.

1st Mixing Stage:
BUNA® CB 24 and BUNA® VSL 5025-2 was used as initial charge in an internal mixer and mixed for about 30 seconds addition of two thirds of VULKASIL® S, two thirds of SI® 69, two thirds of the total quantity of ω-mercaptocarboxylic esters of polyhydric alcohols, and mixing for about 60 seconds addition of one third of VULKASIL® S, one third of SI® 69, one third of the total quantity of ω-mercaptocarboxylic esters of polyhydric alcohols, and also TUDALEN 1849-1, and mixing for about 60 seconds addition of CORAX® N 339, EDENOR® C 18 98-100, VULKANOX® 4020/LG, VULKANOX® HS/LG, ROTSIEGEL ZINC WHITE, and ANTILUX® 654, and mixing for about 60 seconds. The mixing temperature was 150° C.

2nd Mixing Stage:
After conclusion of the first mixing stage, the mixture was passed to a downstream roll mill, shaped to give a sheet, and stored for 24 hours at room temperature. The processing temperatures here were below 60° C.

3rd Mixing Stage:
The third mixing stage involved further mastication at 150° C. in a kneader.

4th Mixing Stage:
Addition of the additional substances 90/95 CHANCEL GROUND SULFUR, VULKACIT® CZ/C, VULKACIT® D/C on a roll at temperatures below 80° C.

The rubber mixtures were then fully vulcanized at 170° C. Table 2 gives the properties of the rubber preparations produced and of vulcanizates of these.

TABLE 1

| | Reference | Rubber formulation 1 | Rubber formulation 2 | Rubber formulation 3 |
|---|---|---|---|---|
| | | Rubber formation | | |
| BUNA CB 24 | 30 | 30 | 30 | 30 |
| BUNA VSL 5025-2 | 96 | 96 | 96 | 96 |
| CORAX N 339 | 6.4 | 6.4 | 6.4 | 6.4 |
| VULKASIL S | 80 | 80 | 80 | 80 |
| TUDALEN 1849-1 | 8 | 8 | 8 | 8 |
| EDENOR C 18 98-100 | 1 | 1 | 1 | 1 |
| VULKANOX 4020/LG | 1 | 1 | 1 | 1 |
| VULKANOX HS/LG | 1 | 1 | 1 | 1 |
| ROTSIEGEL ZINC WHITE | 2.5 | 2.5 | 2.5 | 2.5 |
| ANTILUX 654 | 1.5 | 1.5 | 1.5 | 1.5 |
| SI 69 | 6.4 | 6.4 | 6.4 | 6.4 |
| VULKACIT D/C | 2 | 2 | 2 | 2 |
| VULKACIT CZ/C | 1.5 | 1.5 | 1.5 | 1.5 |
| CHANCEL 90/95 GROUND SULFUR | 1.5 | 1.5 | 1.5 | 1.5 |
| Compound 1 | | 1 | | |
| Compound 2 | | | 1 | |
| Compound 3 | | | | 1 |

Table 1a

| | Reference | Rubber formulation 4 | Rubber formulation 5 | Rubber formulation 6 |
|---|---|---|---|---|
| BUNA CB 24 | 30 | 30 | 30 | 30 |
| BUNA VSL 5025-2 | 96 | 96 | 96 | 96 |
| CORAX N 339 | 6.4 | 6.4 | 6.4 | 6.4 |
| VULKASIL S | 80 | 80 | 80 | 80 |
| TUDALEN 1849-1 | 8 | 8 | 8 | 8 |
| EDENOR C 18 98-100 | 1 | 1 | 1 | 1 |
| VULKANOX 4020/LG | 1 | 1 | 1 | 1 |
| VULKANOX HS/LG | 1 | 1 | 1 | 1 |
| ROTSIEGEL ZINC WHITE | 2.5 | 2.5 | 2.5 | 2.5 |
| ANTILUX 654 | 1.5 | 1.5 | 1.5 | 1.5 |
| SI 69 | 6.4 | 6.4 | 6.4 | 6.4 |
| VULKACIT D/C | 2 | 2 | 2 | 2 |
| VULKACIT CZ/C | 1.5 | 1.5 | 1.5 | 1.5 |
| CHANCEL 90/95 GROUND SULFUR | 1.5 | 1.5 | 1.5 | 1.5 |
| Compound 4 | | 1 | | |
| Compound 5 | | | 1 | |
| Compound 6 | | | | 1 |

| Trade name | Description | Producer/Marketed by |
|---|---|---|
| BUNA CB 24 | BR | Lanxess Deutschland GmbH |
| BUNA VSL 5025-2 | SBR | Lanxess Deutschland GmbH |
| CORAX N 339 | Carbon black | Degussa-Evonik GmbH |
| VULKASIL S | Silica | Lanxess Deutschland GmbH |
| TUDALEN 1849-1 | Mineral oil | Hansen&Rosenthal KG |
| EDENOR C 18 98-100 | Stearic acid | Cognis Deutschland GmbH |
| VULKANOX 4020/LG | N-1,3-Dimethylbutyl-N-phenyl-p-phenylenediamine | Lanxess Deutschland GmbH |
| VULKANOX HS/LG | Polymerized 2,2,4-trimethyl-1,2-dihydroquinoline | Lanxess Deutschland GmbH |
| ROTSIEGEL ZINC WHITE | Zinc oxide | Grillo Zinkoxid GmbH |
| ANTILUX 654 | Light stabilizer wax | RheinChemie Rheinau GmbH |
| SI 69 | Bis(triethoxysilylpropyl) tetrasulfide | Evonik industries |
| VULKACIT D/C | 1,3-Diphenylguanidine | Lanxess Deutschland GmbH |
| VULKACIT CZ/C | N-cyclohexyl-2-benzothiazole-sulfenamide | Lanxess Deutschland GmbH |
| CHANCEL 90/95 GROUND SULFUR | Sulfur | Solvay Deutschland GmbH |

Quantities stated in phr (parts by weight per 100 parts of rubber)

TABLE 2

Summary of results

| Parameter | Unit | DIN | Reference | Rubber formulation 1 | Rubber formulation 2 | Rubber formulation 3 |
|---|---|---|---|---|---|---|
| Mooney viscosity (ML 1 + 4) | [MU] | 53523 | 94 | 121 | 116 | 109 |
| Mooney scorch for 130° C. (t5) | sec | in acc. with ASTM D5289-95 | 602 | 388 | 398 | 405 |
| Full vulcanization for 170° C./t95 | sec | 53529 | 1494 | 1963 | 1671 | 1646 |
| Shore A hardness at 23° C. | [Shore A] | 53505 | 65 | 68 | 68 | 65 |
| Tensile strength | MPa | 53504 | 22 | 20 | 19 | 18 |
| Abrasion | mm³ | 53516 | 65 | 49 | 52 | 53 |
| Wet grip (tan δ (0° C.)) | — | | 0.430 | 0.474 | 0.483 | 0.481 |
| Rolling resistance (tan δ (60° C.)) | — | | 0.129 | 0.111 | 0.114 | 0.109 |

When the vulcanizates tested are compared with the reference they exhibit very good wet grip (tan δ at 0° C.>0.45) and excellent rolling resistance values (tan δ at 60° C.<0.12) combined with extremely advantageous abrasion values (<60 mm³). Results obtained from the vulcanizates of rubber formulations 4-6 comprising zinc salts of the ω-mercapto-$C_2$-$C_6$-carboxylic esters of polyhydric $C_2$-$C_6$-alcohols were similar to those from rubber formulations 1-3.

What is claimed is:

1. A rubber mixture comprising:
 a natural rubber, a styrene butadiene rubber, and a butadiene rubber,
 a sulfur-containing alkoxysilane,
 a silica-based filler, and
 a ω-mercapto-$C_2$-$C_6$-carboxylic ester of a polyhydric $C_2$-$C_6$-alcohol in which at least 2, of the hydroxy groups of the polyhydric $C_2$-$C_6$-alcohol are esterified with ω-mercapto-$C_2$-$C_6$-carboxylic acid(s), where the expression ω-mercapto-$C_2$-$C_6$-carboxylic ester of a polyhydric $C_2$-$C_6$-alcohol also encompasses salts of ω-mercapto-$C_2$-$C_6$-carboxylic esters of polyhydric $C_2$-$C_6$-alcohols.

2. The rubber mixture as claimed in claim 1, further comprising at least one crosslinking agent.

3. The rubber mixture as claimed in claim 1 or 2, wherein the total quantity of ω-mercapto-$C_2$-$C_6$-carboxyfic ester(s) is from 0.1 to 15 phr.

4. The rubber mixture as claimed in claim 1, wherein the polyhydric alcohol is ethylene glycol, diethylene glycol, Methylene glycol, trimethylolpropane, neopentyl glycol, glycerol, or pentaerythritol.

5. The rubber mixture as claimed in claim 1, wherein the ω-mercapto-$C_2$-$C_6$-carboxylic ester is based on one or more ω-mercapto-$C_2$-$C_6$-carboxylic acids which have, between thiol group and carboxy group, a linear or branched, $C_1$-$C_5$-alkanediyl unit.

6. The rubber mixture as claimed in claim 1, where the ω-mercapto-$C_2$-$C_6$-carboxylic ester of a polyhydric $C_2$-$C_6$-alcohol is one or more compounds of the formula (I),

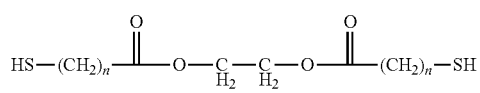

(I)

and/or of the formula (II),

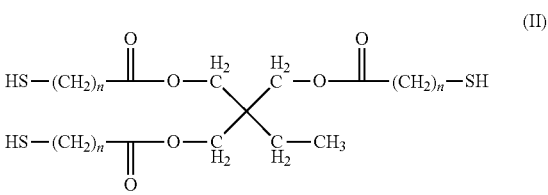

(II)

and/or of the formula (III)

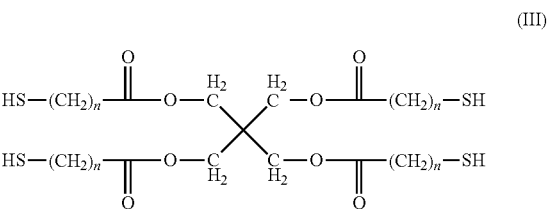

(III)

where n is 1, 2, or 3.

7. The rubber mixture as claimed in claim 1, wherein the total content of sulfur-containing alkoxysilane is 2 to 20 phr, where the ratio by weight of alkoxysilane to the total quantity of ω-mercapto-$C_2$-$C_6$-carboxylic ester(s) of a polyhydric $C_2$-$C_6$-alcohol is from 1.5:1 to 20:1.

8. The rubber mixture as claimed in claim 1, wherein the silica-based filler is selected from the group of precipitated silica, fumed silica, natural silicates and synthetic silicates.

9. The rubber mixture as claimed in claim 1, wherein the rubber mixture comprises other fillers selected from carbon blacks and/or rubber auxiliaries.

10. A process for the production of the rubber mixture as claimed in claim 1, the process comprising mixing of the rubbers with the at least one silica-based filler, the sulfur-containing alkoxysilane, and the at least one ω-mercapto-carboxylic ester of a polyhydric alcohol.

11. A process for the production of vulcanizates, the process comprising vulcanizing the rubber mixture as claimed in claim 1.

12. A vulcanizate obtained via vulcanization of the rubber mixture as claimed in claim 1.

13. The rubber mixture as claimed in claim 1, wherein:
at least 66% of the hydroxy groups of the polyhydric $C_2$-$C_6$-alcohol are esterified with ω-mercapto-$C_2$-$C_6$-carboxylic acids;
the polyhydric alcohol is ethylene glycol, trimethyiolpropane, or pentaerythritol; and
the ω-mercapto-$C_2$-$C_6$-carboxylic ester is based on one or more ω-mercapto-$C_2$-$C_6$-carboxylic acids which have, between thiol group and carboxy group, a linear $C_1$-$C_3$ alkanediyl unit.

14. The rubber mixture as claimed in claim 6, wherein:
the total content of sulfur-containing alkoxysilane is 3 to 11 phr, where the ratio by weight of alkoxysliane to the total quantity of ω-mercapto-$C_2$-$C_6$-carboxylic ester(s) of a polyhydric $C_2$-$C_6$-alcohol is 3:1 to 15:1;
the silica-based filler is selected from the group of precipitated silicas or silicates with specific surface area from 20 to 400 m²/g; and
the rubber mixture comprises:
as rubber, at least one natural rubber, at least one styrene butadiene rubber, and at least one butadiene rubber in a ratio by weight of styrene butadiene rubber to butadierie rubber to natural rubber of 60 to 85: 10 to 35: 5 to 20; and
other fillers selected from the group consisting of carbon blacks and/or rubber auxiliaries selected from the group consisting of reaction accelerators, aging inhibitors, heat stabilizers, light stabilizers, antioxidants, antiozonanks, flame retardants, processing aids, impact-resistance improvers, plasticizers, tackifiers, blowing agents, dyes, pigments, waxes, extenders, organic acids, retarders, metal oxides, activators and anti-reversion agents.

15. The rubber mixture as claimed in claim 1, wherein:
at least 75% of the hydroxy groups of the polyhydric $C_2$-$C_6$-alcohol are esterified with ω-mercapto-$C_2$-$C_6$-carboxylic adds;
the polyhydric alcohol is trimethyloipropane or pentaerythritol;
the ω-mercapto-$C_2$-$C_6$-carboxylic ester is based on one or more ω-mercapto-$C_2$-$C_6$-carboxylic adds which have, between thiol group and carboxy group, a $C_2$-alkanediyl unit;
the total content of sulfur-containing alkoxysilane is 5 to 8 phr, where the ratio by weight of alkoxysilane to the total quantity of 107 -mercapto-$C_2$-$C_6$-carboxylic ester(s) of a polyhydric $C_2$-$C_6$-alcohol is 5:1 to 10:1;
the silica-based filler is selected from the group of precipitated silicas and silicates with specific surface area from 100 to 200 m²/g; and
the rubber mixture comprises:
as rubber, at least one styrene-butadiene rubber, at least one butadiene rubber, and at least one natural rubber in a ratio by weight of styrene-butadiene rubber to butadiene rubber to natural rubber of 60 to 85: 10 to 35: 5 to 20; and
at least one cross-linking agent.

16. The process according to claim 10, wherein the mixing comprises a multistage mixing process in which the addition of ω-mercaptocarboxylic ester of polyhydric alcohols takes place in the first stage of the mixing process, and the addition of one or more crosslinking agents takes place in a subsequent mixing stage.

17. The process according to claim 11, wherein the rubber mixture is vulcanized with temperatures of the composition of 130° C. to 180° C.

* * * * *